US012354452B2

(12) United States Patent
Gulick, Jr. et al.

(10) Patent No.: US 12,354,452 B2
(45) Date of Patent: Jul. 8, 2025

(54) UTILITY SECURITY APPARATUS

(71) Applicant: Scorpion Security Products, Inc., Vestal, NY (US)

(72) Inventors: Franklyn W. Gulick, Jr., Binghamton, NY (US); Patrick McEwen, Greene, NY (US); Patrick Dunleavy, Endwell, NY (US); Gary R. Page, Chenango Forks, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 67 days.

(21) Appl. No.: 18/105,452

(22) Filed: Feb. 3, 2023

(65) Prior Publication Data

US 2023/0252869 A1 Aug. 10, 2023

Related U.S. Application Data

(60) Provisional application No. 63/306,663, filed on Feb. 4, 2022.

(51) Int. Cl.
*G08B 13/00* (2006.01)
*G08B 13/24* (2006.01)

(52) U.S. Cl.
CPC ................................ *G08B 13/2434* (2013.01)

(58) Field of Classification Search
CPC ... G08B 13/2434; E05B 67/365; E05B 67/00; E05B 67/36; E05B 47/0045; E05B 9/10; E05B 9/00; E05B 9/105; E05B 9/042; E05B 17/0062; E05B 17/2092; E05B 27/006; E05B 27/00; E05B 27/0057; E05B 27/0064; E05B 27/0067; E05B 27/02; E05B 27/10; Y10T 70/7057
See application file for complete search history.

(56) References Cited

U.S. PATENT DOCUMENTS

| | | | | |
|---|---|---|---|---|
| 2006/0010945 A1* | 1/2006 | Herdman | E05B 27/005 | 70/383 |
| 2012/0085134 A1* | 4/2012 | Ezzo | E05B 73/0017 | 70/15 |
| 2020/0024867 A1* | 1/2020 | Lee | G07C 9/00309 | |

* cited by examiner

*Primary Examiner* — James J Yang
*Assistant Examiner* — Anthony D Afrifa-Kyei
(74) *Attorney, Agent, or Firm* — Barclay Damon LLP

(57) ABSTRACT

A utility security apparatus includes a body defining a first cavity, a second cavity and a third cavity. A security member including a first end fixedly secured in the third cavity, and an opposing second end. A lock assembly is structured to be at least partially positioned in the first cavity the lock assembly comprising a barrel operatively coupled to a lock pin. A movement of at least a portion of the barrel is configured to control a movement of the lock assembly between a locked position and an unlocked position. In the unlocked position, the second end of the security member is moveable relative to the body and in the locked positon, the second end of the security member is inhibited from moving relative to the body by an engagement with the lock pin.

20 Claims, 7 Drawing Sheets

UTILITY SECURITY APPARATUS

CROSS-REFERENCE TO RELATED APPLICATION

This application is a non-provisional of and claims priority to U.S. Provisional Application No. 63/306,663, filed Feb. 4, 2022. The entire contents of said application are hereby incorporated by reference.

TECHNICAL FIELD

The foregoing disclosure relates to utility security apparatus enabling secure display of a variety of different types, shapes, and sizes of goods as well as easy removal an re-securing of said goods by retail employees.

BACKGROUND OF THE INVENTION

Shoplifting is a cost of doing business for retailers and securing inventory while displaying it for consumers is a real challenge. As more and more retail business is conducted over the Internet, brick-and-mortar retail outlets continue to work on improving the customer experience in order to maintain or even increase their market share. Part of the customer experience continues to be the ability to touch, hold, and even test merchandise at retail locations before making a purchase. As a result, retailers are challenged with fitting their merchandise with anti-theft devices that are capable of providing a high level of security to deter and prevent theft, while being unobtrusive enough so as to enable the customer to interact with and have a positive experience with the merchandise.

Currently there are anti-theft devices and systems for portable electronic devices that secure said device to a display surface while allowing the customer to have access to the touchscreen, keypad, or other features of the electronic device. Some of these anti-theft devices even allow the customer to pick up the electronic device while keeping it securely tethered to an anchor in order to prevent theft. However, such anti-theft devices are specifically designed to work with the relatively small portable electronic devices such as Smart Phones, tablets, and laptop computers, and are unable to be used to secure other merchandise that require the same freedom to touch and test.

Merchandise, such as power tools, televisions, yard equipment, and sports equipment are too large and improperly proportioned to be used with the existing range of anti-theft devices that are used for portable electronic devices. Likewise, small items such as jewelry, fashion accessories, and the like are too small and improperly proportioned to be used with the current range of anti-theft devices that are used for portable electronics. Some of the anti-theft devices used with such larger merchandise typically include security tags that communicate with a sensor located within the retail space, which produces an alarm when the security tag passes beyond the sensor boundary. Other anti-theft devices for larger merchandise include fixed displays where the merchandise is locked in place, which severely limits or even prevents holding or testing the merchandise. In other retail environments, larger merchandise may be held in locked display units, which could make them completely inaccessible to customers. Moreover, such display units require an employee of the retailer to unlock or otherwise access the unit in order to remove merchandise of interest in order to provide the customer with the opportunity to conduct a closer and more thorough examination prior to purchase.

These are just some of the problems associated with current anti-theft devices and associated systems used to secure retail merchandise.

SUMMARY

A utility security apparatus comprises a body, a security member and a lock assembly. The body defines a first cavity, a second cavity and a third cavity. A security member comprises a first end and a second end, with the first end being configured to be fixedly secured in the third cavity. A lock assembly is configured to be at least partially positioned in the first cavity and includes a barrel operatively coupled to a lock pin. A movement of at least a portion of the barrel is configured to control a movement of the lock assembly between a locked position and an unlocked position. In the unlocked position, the second end of the security member is moveable relative to the body. In the locked positon, the second end of the security member is inhibited from moving relative to the body by an engagement with the lock pin.

In an embodiment, the utility security apparatus further comprises an alarm. In another embodiment, the utility security apparatus further comprises an anchor connected to the body. In an embodiment, the utility security apparatus may further comprise an anchor member connected at one end to the anchor and configured to inhibit removal of the body from a retail area. In an embodiment, an anchor member is connected at one end to the anchor and is configured to inhibit removal of the body from a retail area. In an embodiment, at least one of the first, second and third cavities is connected to another of the first, second and third cavities. In another embodiment, the anchor member comprises one of a steel wire and a cord comprising a polymeric material. In an embodiment, the lock assembly further comprises at least one resilient member configured to bias the lock assembly in the unlocked position. In an embodiment, the body further comprises at least one removable portion. In an embodiment, at least one actuator is configured to actuate one or more components of the lock assembly.

An embodiment of a method of manufacturing a utility security apparatus includes structuring a body to define a first cavity, a second cavity and a third cavity. A security member is further structured to comprise a first end and a second end such that the first end of the security member is fixedly secured in the third cavity. A lock assembly is structured to; (1) be at least partially positioned in the first cavity; (2) comprise a barrel operatively coupled to a lock pin; and (3) control a movement of the lock assembly between a locked position and an unlocked position. In the unlocked position, the security member is moveable relative to the body, and in the locked position, the security member is inhibited from moving relative to the body as a result of an engagement with the lock pin.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

Figure 1:
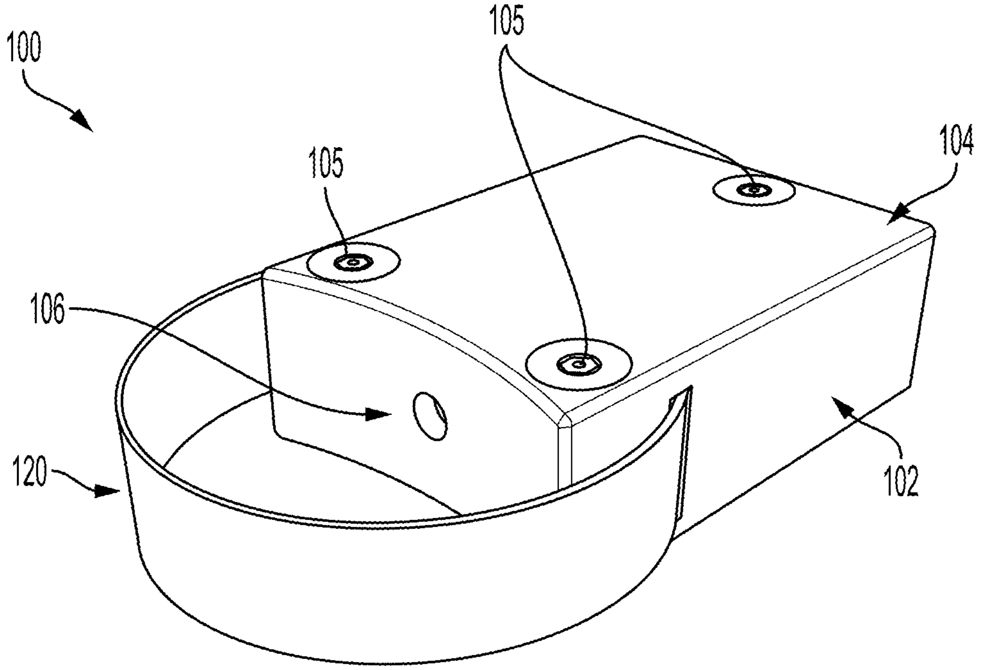
FIG. 1 illustrates a perspective view of an embodiment of a utility security apparatus.

The attached drawings are for purposes of illustration and are not necessarily to scale.

DETAILED DESCRIPTION OF THE INVENTION

The following detailed description refers to the accompanying drawings. Whenever possible, the same reference numbers are used in the drawings and the following description to refer to the same or similar elements. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of the Utility security apparatus and are not specifically provided to scale.

Figure 2:
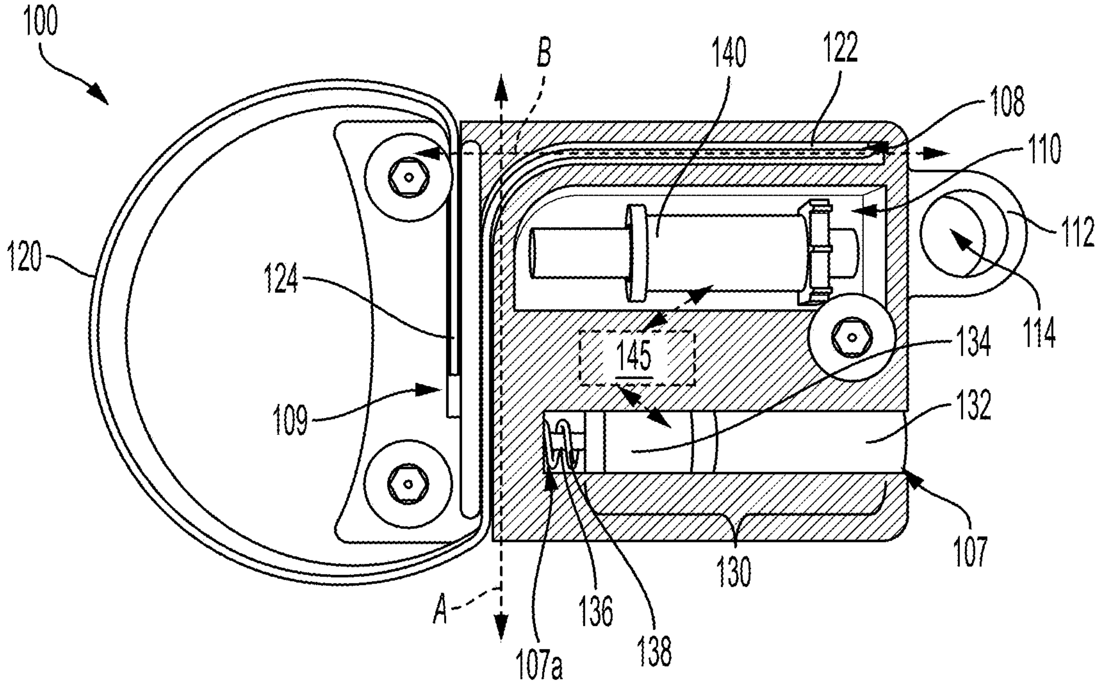
FIG. 2 illustrates a top perspective view of the embodiment of the utility security apparatus of FIG. 1 with the cover removed from the body.

Referring to FIGS. 1 and 2, the utility security apparatus (security apparatus) 100 generally includes a body 102, a security member 120 and a lock assembly 130 at least partially positioned within the body 102 and in cooperation with the security member 120. Some embodiments of the utility security apparatus 100 also include a ferrite transponder 140 or other alarm device. The body 102 includes at least one removable portion or cover 104 that may be removed from the body as is shown in FIG. 2. Alternatively, the cover 104 is secured to the body 102 with a plurality of fasteners 105 as is shown in FIG. 1.

As shown in FIG. 2, with the cover 104 removed from the body 102, it can be seen that the body 102 defines a plurality of cavities 107, 108, 109, 110. The utility security apparatus 100 will be described with reference to the embodiment of FIG. 2 and the components housed in each cavity 107, 108, 109, 110, however it should be realized that the contents of each cavity as well as the overall number of cavities may differ in other embodiments. As will be described, one or more of the cavities 107, 108, 109, 110 may be connected to each other to enable mechanical and/or electrical communication between components. Moreover, one or more of the cavities 107, 108, 109, 110 may be accessible from the outside of the body 102 to enable components to be inserted or removed or to enable the insertion of one or more tools to contact or otherwise manipulate components within the corresponding cavity 107, 108, 109, 110. In the embodiment show, the body 102 includes an anchor 112 defining an anchor opening 114. The anchor 112 may be formed as a single unit with the body 102 or can be a separate component that is fixedly coupled to the body 102.

Figure 3:
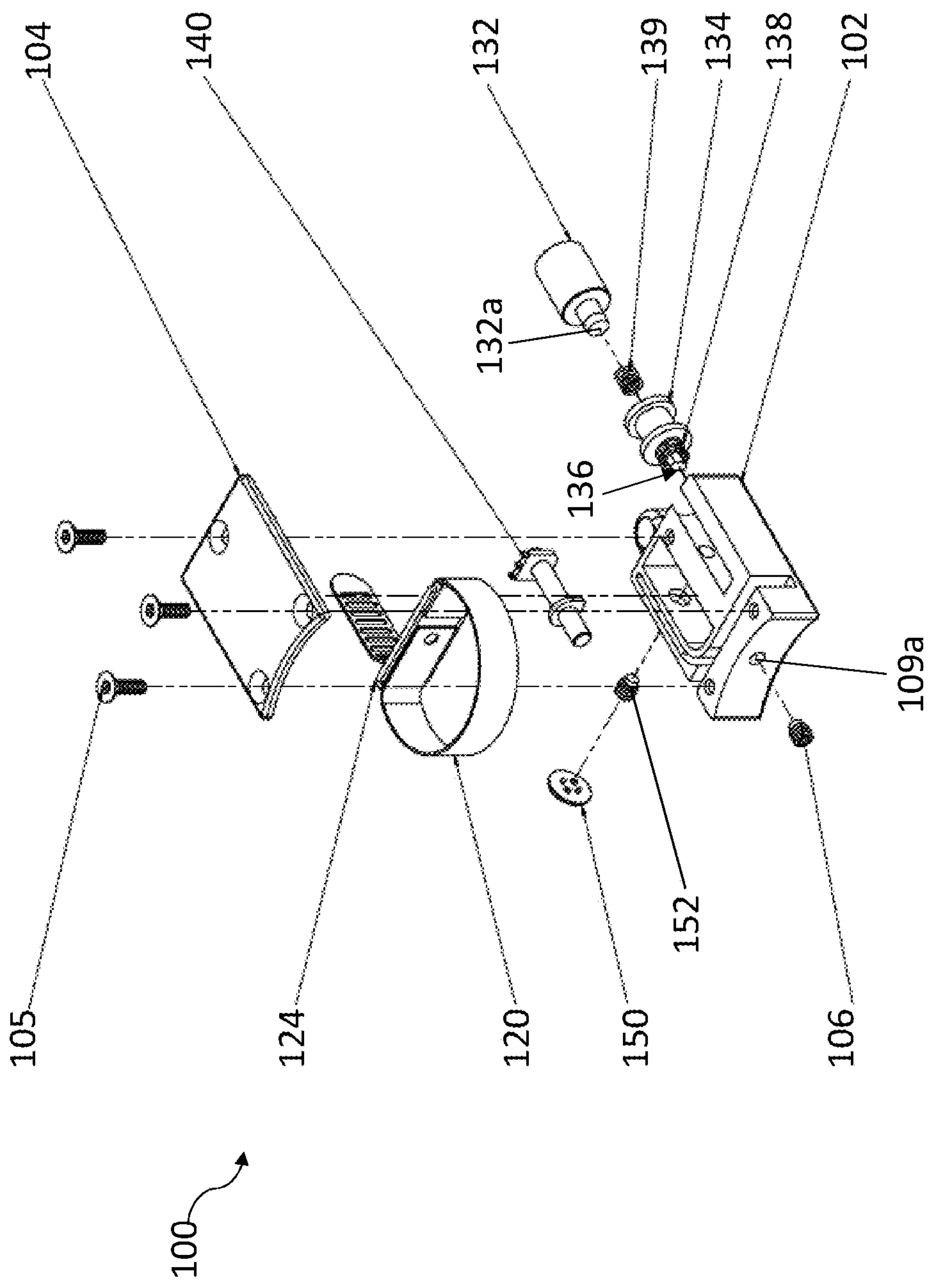
FIG. 3 illustrates an exploded view of an embodiment of the utility security apparatus.
Figure 4:
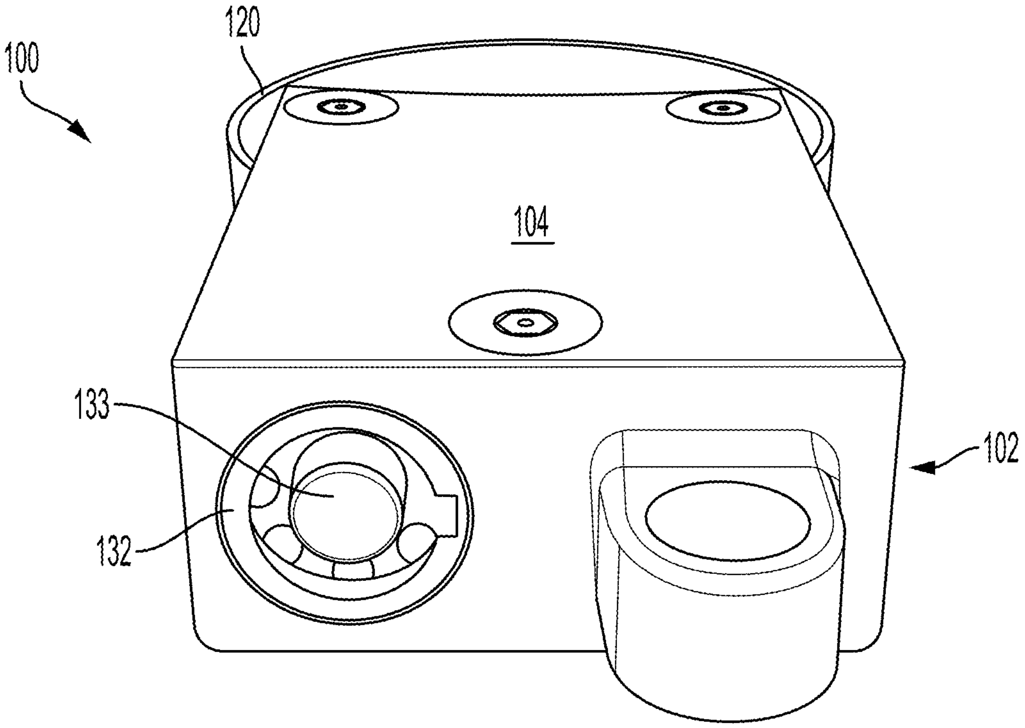
FIG. 4 illustrates another perspective view of the embodiment of the utility security apparatus of FIGS. 1 and 2.

As shown in FIGS. 2-4, a first cavity 107 is open to the exterior of the body 102 and is configured to retain and at a least partially house a lock assembly 130. The lock assembly 130 generally includes a barrel 132 that is coupled to or in contact with a lock pin member 134 at a first end. As shown in FIG. 3, the barrel 132 includes a barrel projection **132*a* that is configured to engage and at least partially be seated in the lock pin member 134. As shown in FIG. 4, the barrel 132 includes a lock member 133 that is at least partially retained by the barrel 132. A resilient member 139, such as a compression spring, is positioned around the barrel projection 132*a* and extends between the barrel and the lock pin member 134. The second or opposing end of the lock pin member 134 defines a lock pin 136 that projects towards the bottom 107*a* of the first cavity 107. In an embodiment, the lock pin 136 may be a separate component joined with or in in contact with the second end of the lock pin member 134. The lock pin 136 is a smaller diameter than the lock pin member 134 and is surrounded by a resilient member 138, such as a compression spring. As shown, the compression spring 138 extends between the second end of the lock pin member 134 and the bottom 107*a* of the first cavity 107. One or more of the resilient members 138, 139 may act to bias the lock assembly 130 in the unlocked position. The bottom 107*a* of the first cavity 107 defines an opening (not shown) that connects the first cavity 107 with a second cavity 108 and that is dimensioned to enable at least part of the lock pin 136 to be advanced into the opening (not shown) and into the second cavity 108**.

As shown, the second opening 108 extends along two intersecting axes A, B such that the second cavity 108 generally forms an "L" shape with at least one leg of the "L" open to the exterior of the body 102. As shown in the embodiment of FIG. 3, a snap-in plug 150 is provided along with a fastener 152 that extends at least partially into the second cavity 108. When the fastener 152 at least partially extends into the second cavity 108, it also contacts and at least partially traverses the security member 120 to further secure the security member 120 relative to the body 102. As shown in FIGS. 2 and 3, the third cavity 109 extends along an axis parallel to the axis A with at least one end that is open to the exterior of the body 102. The third cavity 109 further defines at least one through hole **109*a* that extends from the third cavity 109 to the outside of the body 102. The fourth cavity 110 is positioned between the first cavity 107 and at least one leg of the second cavity 108. As shown, the fourth cavity 110 is not open to the exterior of the body 102 and is configured to house the alarm device 140**.

In an embodiment, one or more actuators may be operatively coupled to the lock assembly to control movement between the locked and unlocked positions in response to electronic signals received by a processor 145 housed in the body 102. In this embodiment, the processor 145 may be in electrical communication with the alarm device and an actuator of the lock assembly 130 such that the utility security apparatus 100 may be controlled remotely. In an embodiment, the lock barrel 132 or the lock pin member 134 may be replaced by one or more actuators that control movement of the lock assembly between the locked and unlocked position.

A method of securing an item with the utility security apparatus 100 will now be discussed with general reference to the embodiments of FIGS. 1-4. FIGS. 1, 2 and 4 show the utility security apparatus 100 in a locked state. To unlock the utility security apparatus 100, the lock barrel 132 and/or lock member 133 are engaged with (or moved via an actuator) using a proprietary tool or key to cause the lock barrel and/or the lock member 133 to retract from the lock pin member 134. This enables the compression spring 138, which is in a compressed state, to relax and retract the lock pin 138 from the second cavity 108, thereby biasing the utility security apparatus in the unlocked position. The additional compression member 139 may also aid the spring-loaded movement of one or more parts of the lock assembly 130. The first end 122 of the security member 120 may now be pulled from the second cavity 108 of the body 102. In the embodiment including the plug 150 and the fastener 152, these elements must be removed before the first end 122 of the security member 120 san be pulled from the second cavity 108 of the body 102. The second end 124 of the security member 120 is positioned in the third cavity 109 and is fixedly coupled within the third cavity 109 to the body 102 with a fastener 106 that traverses the opening **109*a* and engages or at least partially traverses the second end 124 of the security member 120**.

Figure 5A:
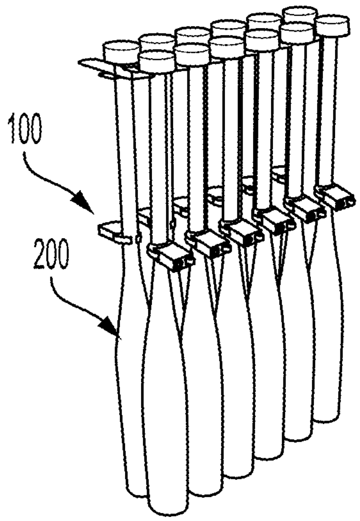
FIG. 5A illustrates a perspective view of a plurality of utility security apparatuses each securing a baseball bat.
Figure 5B:
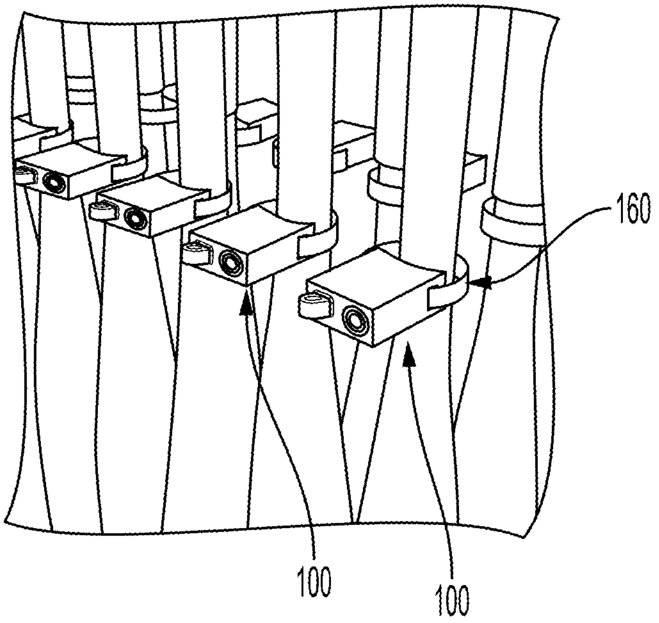
FIG. 5B illustrates close-up perspective view of the embodiment of FIG. 5A.
Figure 6A:
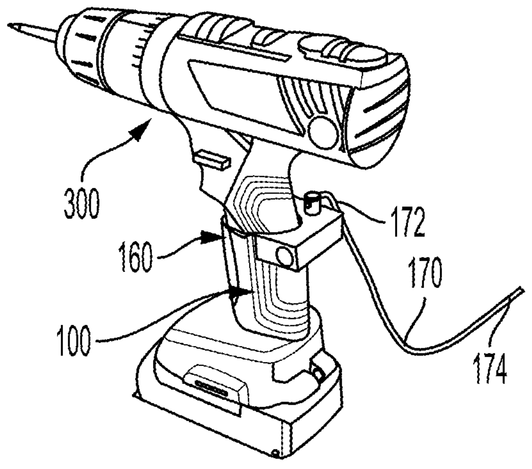
FIG. 6A illustrates a perspective view of an embodiment of a utility security apparatus with an anchor member securing a power drill.
Figure 6B:
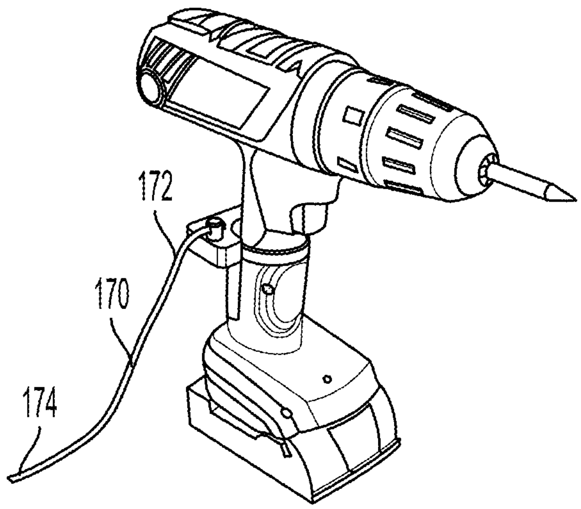
FIG. 6B illustrates another perspective view of the embodiment of FIG. 6A.
Figure 7A:
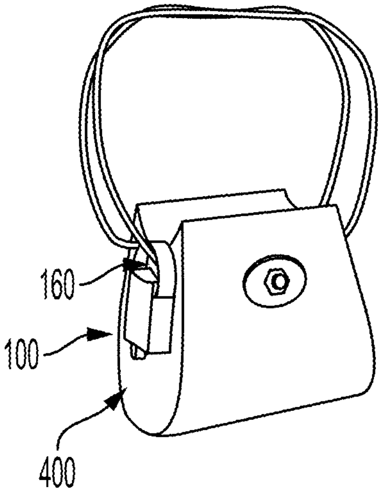
FIG. 7A illustrates a perspective view of an embodiment of a utility security apparatus securing a handbag.
Figure 7B:
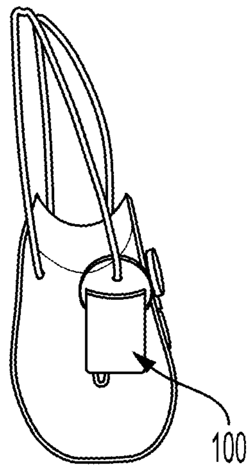
FIG. 7B illustrates another perspective view of the embodiment of FIG. 7A.

The first end 122 of the security member 120 can then be wrapped around an item such as a portion of a baseball bat 200 (FIGS. 5A-B), a power drill 300 (FIGS. 6A-B), or a handbag 400 (FIGS. 7A-B). The first end 122 of the security member 120 is then inserted into the second cavity 108 until a snug loop 160 (FIGS. 5B, 6A, and 7A) is created around the portion of the item. The lock assembly 130 is then engaged, which can be done using the proprietary key or tool, or in an embodiment the actuator can move the lock assembly into the locked position. Once engaged, the barrel 132 pushes the barrel portion **132*a* into the lock pin member 134, which in turn, pushes the lock pin member 134 towards the bottom 107*a* of the first cavity 107. As the lock pin member 134 advances towards the bottom 107*a* of the first cavity 107, the lock pin 136 advances into second cavity and into contact and/or through a portion of the security member 120**.

This compresses the resilient member 138 between the bottom **107*a* of the first cavity 107 and the lock pin member 134. The security member 120 may define a plurality of openings that are each configured to accommodate the lock pin 136. The lock assembly 130 then catches such that it maintains the utility security apparatus 100 in the locked state such that the first end 122 of the security member 120 is inhibited from being removed from the housing 102. In an embodiment, when in the locked state, the security member 120 may still be able to be moved in a first direction relative to the body 102, where the first direction results in the loop 160** becoming smaller in diameter.

Referring to FIGS. 6A-B, an anchor member 170 is secured at a first end 172 to the anchor 112 of the body 102. The second end 174 of the anchor member 170 may be secured to a display fixture or other robust structure such that the secured item, in this case a power drill 300, cannot be moved away from the display fixture at a distance greater than the length of the anchor member 170. In an embodiment, the anchor member 170 is a steel wire, a braided nylon cord or other polymeric material, or any suitable material that is resistant to wear-and-tear, breakage, and/or tampering. The alarm device 140 that is positioned in the body 102 acts as another defense against theft. In an embodiment, the alarm device 140 will sound an audible and/or visual alarm when the utility security apparatus 100 is attempted to be removed from a retail space. For example, the alarm device 140 is configured to detect and be triggered by alarm sensors positioned at an entrance/exit of a retail setting. The alarm device 140 may also be triggered upon tampering of the utility security apparatus 100. In another embodiment, the alarm device 140 may be electrically coupled to a processor in the housing 102 and be capable of being triggered remotely.

One advantage that can be realized by the utility security apparatus 100 is the simple application and removal of a device by sales personnel to prevent theft of the item being secured. Another advantage is the versatility of the utility security apparatus 100 in its ability to secure a variety of different shapes and sizes of items. Another advantage is that the utility security apparatus 100 can be used in a variety of anti-theft protocols that are already present in a retail setting and does not necessarily require expensive and proprietary communications and monitoring systems to work in conjunction with the utility security apparatus 100. Still another advantage is that the utility security apparatus 100 can be incorporated into a preexisting display without the need to change display fixtures.

The invention is inclusive of combinations of the aspects described herein. References to an "embodiment" and the like refer to features that are present in at least one aspect of the invention. Separate references to "an embodiment" or "particular aspects" or the like do not necessarily refer to the same aspect or aspects; however, such aspects are not mutually exclusive, unless so indicated or as are readily apparent to one of skill in the art. The use of singular or plural in referring to "club" or "clubs" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A utility security apparatus comprising:

a body defining a first cavity, a second cavity and a third cavity;

a lock assembly configured to be at least partially positioned in the first cavity and including a lock barrel operatively coupled to a lock pin; and a security member comprising a first end and a second end, wherein the first end is configured to be received in the second cavity and the second end is configured to be fixedly secured in the third cavity such that security member is inhibited from being moved within the third cavity, wherein a movement of at least a portion of the barrel is configured to control a movement of the lock assembly between a locked position and an unlocked position, wherein in the unlocked position, the first end of the security member is moveable within the second cavity and the second end of the security member fixedly secured in the third cavity such that the security member is inhibited from being moved within the third cavity, and wherein actuation of the lock barrel into the locked position advances the lock pin into the second cavity to engage the second end and inhibit the second end from moving relative to the body.

2. The utility security apparatus of claim 1, further comprising an alarm.

3. The utility security apparatus of claim 1, further comprising an anchor connected to the body.

4. The utility security apparatus of claim 3, further comprising an anchor member connected at one end to the anchor and configured to inhibit removal of the body from a retail area.

5. The utility security apparatus of claim 1, wherein at least one of the first, second, and third cavities is connected to another of the first, second, and third cavities.

6. The utility security apparatus of claim 4, wherein the anchor member comprises one of a steel wire and a cord comprising a polymeric material.

7. The utility security apparatus of claim 1, wherein the lock assembly further comprises at least one resilient member configured to bias the lock assembly in the unlocked position.

8. The utility security apparatus of claim 1, wherein the body further comprises at least one removable portion.

9. The utility security apparatus of claim 1, further comprising at least one actuator configured to actuate one or more components of the lock assembly.

10. The utility security apparatus of claim 1, wherein the second cavity extends along two intersecting axes.

11. The utility security apparatus of claim 1, further comprising a fastener configured to extend from an outer surface of the body into the second cavity to engage the first end of the security member.

12. The utility security apparatus of claim 1, wherein the second cavity and the third cavity are closed off at one end from an exterior of the body, and wherein the second cavity and the third cavity are open at one end to the exterior of the body.

13. The utility security apparatus of claim 12, wherein the second cavity and the third cavity are open to opposing sides of the body.

14. A method of manufacturing a utility security apparatus, comprising:

structuring a body to define a first cavity, a second cavity and a third cavity;

structuring a security member to comprise a first end and a second end;

structuring a lock assembly to, be at least partially positioned in the first cavity, comprise a barrel operatively coupled to a lock pin, and control a movement of the lock assembly between a locked position and an unlocked position;

structuring the first end to be received by the second cavity; and structuring the second end of the security member to be fixedly secured in the third cavity such that security member is inhibited from being moved within the third cavity, wherein in the unlocked position, the first end is of the security member is moveable within the second cavity and the second end of the security member fixedly secured in the third cavity such that security member is inhibited from being moved within the third cavity, and wherein actuating the barrel into the locked position advances the lock pin into the second cavity to engage the first end to inhibit the first end of the security member from moving relative to the body.

15. The method of claim 14, further comprising structuring the body to house an alarm.

16. The method of claim 14, further comprising structuring the body to comprise an anchor configured to be connected to an end of an anchor member, wherein the anchor member is configured to inhibit removal of the body from a retail area.

17. The method of claim 14, further comprising structuring at least one of the first, second and third cavities to be connected to another of the first, second and third cavities.

18. The method of claim 14, further comprising structuring at least one resilient member configured to bias the lock assembly in the unlocked position.

19. The method of claim 14, further comprising structuring the body to further comprise at least one removable portion.

20. The method of claim 14, further comprising structuring at least one actuator configured to actuate one or more components of the lock assembly.

* * * * *